United States Patent
Brickell

(10) Patent No.: US 10,652,245 B2
(45) Date of Patent: *May 12, 2020

(54) EXTERNAL ACCESSIBILITY FOR NETWORK DEVICES

(71) Applicant: Ernest Brickell, Hillsboro, OR (US)

(72) Inventor: Ernest Brickell, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,508

(22) Filed: Jul. 2, 2019

(65) Prior Publication Data

US 2019/0327235 A1    Oct. 24, 2019

Related U.S. Application Data

(63) Continuation-in-part of application No. 15/586,681, filed on May 4, 2017, now Pat. No. 10,348,706.

(51) Int. Cl.
*H04L 29/06* (2006.01)
*G06F 21/60* (2013.01)
(Continued)

(52) U.S. Cl.
CPC ............ *H04L 63/10* (2013.01); *G06F 21/602* (2013.01); *H04L 9/0869* (2013.01);
(Continued)

(58) Field of Classification Search
None
See application file for complete search history.

(56) References Cited

U.S. PATENT DOCUMENTS 5,253,344 A   10/1993   Bostick et al.
5,937,066 A   8/1999   Gennaro et al.
(Continued)

FOREIGN PATENT DOCUMENTS

EP       3151144 A1     4/2017
WO   2000/079368 A1    12/2000

OTHER PUBLICATIONS

Abelson et al., "The Risks of Key Recovery, Key Escrow, and Trusted Third-Party Encryption," Final Report—May 27, 1997; this paper grew out of a group meeting at Sun Microsystems in Menlo Park, California, U.S.A. in late Jan. 1997; pdf version available at: <ftp://research.att.com/dist/mab/key_study.ps>.

(Continued)

*Primary Examiner* — Fatoumata Traore
(74) *Attorney, Agent, or Firm* — Edward J. Radlo; Radlo & Su

(57) ABSTRACT

Methods and apparati for permitting Computing Devices 200 to safely accept Payloads 220 from External Access Entity Devices 260, and to safely access external Networks 710. In an apparatus embodiment, a Computing Device 200 contains an Access Control Module 210 comprising an Access Verification Public Key 211 and a Device Signature Key 214. The Access Control Module 210 is configured to verify authorization of an External Access Payload 220 by verifying a digital signature affixed to the Payload 220 using the Access Verification Public Key 211. The authorized External Access Payload 220 is then permitted to execute on the Computing Device 200. The Access Control Module 210 is also configured to receive from a Network Access Device 600 information associated with a Network 710 access request, and to create a plurality of digital signatures, using the Device Signature Key 214, that link said information associated with the Network 710 access request with the Access Verification Public Key 211. In some embodiments, an encryption/decryption key pair 291, 292 is associated with External Access Entity Device 260 to further enhance security.

16 Claims, 12 Drawing Sheets

(51) Int. Cl.
*H04L 9/32* (2006.01)
*H04L 9/08* (2006.01)
*G06F 7/58* (2006.01)

(52) U.S. Cl.
CPC .......... *H04L 9/0894* (2013.01); *H04L 9/3247* (2013.01); *H04L 63/20* (2013.01); *G06F 7/588* (2013.01); *H04L 63/302* (2013.01)

(56) References Cited

U.S. PATENT DOCUMENTS

| | | | |
|---|---|---|---|
| 6,968,456 | B1 | 11/2005 | Tripathi et al. |
| 7,036,010 | B2 | 4/2006 | Wray |
| 7,216,110 | B1 | 5/2007 | Ogg et al. |
| 7,216,369 | B2 | 5/2007 | Wiseman et al. |
| 7,269,261 | B1 | 9/2007 | Jennings |
| 7,418,728 | B2 | 8/2008 | Jerdonek |
| 7,802,111 | B1 | 9/2010 | Tahan |
| 8,127,149 | B1 | 2/2012 | Nachenberg |
| 8,422,682 | B2 | 4/2013 | Ortiz Comet et al. |
| 9,559,842 | B2 | 1/2017 | Baldwin et al. |
| 9,699,167 | B1 | 7/2017 | Tovino et al. |
| 10,182,044 | B1* | 1/2019 | Praus .................... H04L 63/08 |
| 10,205,709 | B2 | 2/2019 | John et al. |
| 10,498,712 | B2 | 12/2019 | Brickell |
| 2002/0032853 | A1 | 3/2002 | Preston et al. |
| 2002/0129274 | A1 | 9/2002 | Baskey et al. |
| 2003/0041250 | A1 | 2/2003 | Proudler |
| 2004/0162980 | A1 | 8/2004 | Lesenne et al. |
| 2005/0114686 | A1 | 5/2005 | Ball et al. |
| 2005/0210286 | A1 | 9/2005 | Jerdonek |
| 2005/0235141 | A1 | 10/2005 | Ibrahim et al. |
| 2006/0005046 | A1 | 1/2006 | Hars |
| 2008/0219445 | A1 | 9/2008 | Yato et al. |
| 2009/0007104 | A1 | 1/2009 | Zimmer et al. |
| 2009/0016534 | A1 | 1/2009 | Ortiz Comet et al. |
| 2009/0092252 | A1 | 4/2009 | Noll et al. |
| 2009/0313682 | A1 | 12/2009 | Rajput et al. |
| 2010/0325710 | A1 | 12/2010 | Etchegoyen |
| 2011/0093700 | A1 | 4/2011 | Mittal |
| 2011/0280402 | A1 | 11/2011 | Ibrahim et al. |
| 2012/0137137 | A1 | 5/2012 | Brickell et al. |
| 2012/0170753 | A1 | 7/2012 | Pandrangi et al. |
| 2012/0296876 | A1 | 11/2012 | Bacinschi et al. |
| 2013/0086684 | A1 | 4/2013 | Mohler |
| 2014/0044265 | A1 | 2/2014 | Kocher et al. |
| 2014/0079221 | A1 | 3/2014 | McCallum et al. |
| 2014/0109178 | A1 | 4/2014 | Barton et al. |
| 2014/0201850 | A1 | 7/2014 | Garcia et al. |
| 2014/0359305 | A1 | 12/2014 | Pappachan et al. |
| 2015/0086012 | A1 | 3/2015 | Chhabra et al. |
| 2015/0089571 | A1 | 3/2015 | Srinivasan et al. |
| 2015/0261952 | A1 | 9/2015 | Sliwa et al. |
| 2016/0065363 | A1 | 3/2016 | Amiri et al. |
| 2016/0065371 | A1 | 3/2016 | Vecera et al. |
| 2016/0089606 | A1 | 3/2016 | Javed Lal Mohammed Ameerjan et al. |
| 2016/0092678 | A1 | 3/2016 | Probert et al. |
| 2016/0094531 | A1 | 3/2016 | Unnikrishnan et al. |
| 2016/0134660 | A1 | 5/2016 | Ponsini et al. |
| 2016/0173461 | A1* | 6/2016 | Schechter ................ G06F 21/31 713/168 |
| 2017/0063547 | A1 | 3/2017 | Brandt et al. |
| 2017/0103228 | A1 | 4/2017 | Yavuz |
| 2017/0272248 | A1 | 9/2017 | Ozzie |
| 2017/0346807 | A1 | 11/2017 | Blasi |
| 2017/0371499 | A1 | 12/2017 | Checkley et al. |
| 2017/0373844 | A1 | 12/2017 | Sykora et al. |
| 2018/0167367 | A1 | 1/2018 | John et al. |
| 2018/0131677 | A1 | 5/2018 | Brickell |
| 2020/0084032 | A1 | 3/2020 | Brickell |

OTHER PUBLICATIONS

Anati et al., "Innovative Technology for CPU Based Attestation and Sealing", ISCA-HASP, Tel Aviv, Israel, 2013; retrieved from the Internet Jan. 17, 2017, <URL: https://software.intel.com/sites/default/files/article/413939/hasp-2013-innovative-technology-for-attestation-and-sealing.pdf>.

ARM Security Technology; Building a Secure System using TrustZone Technology, 2005-2009, Ref. PRD29-GENC-009492C; Chapters 2 and 3; ARM Limited, San Jose, California, U.S.A.

Denning et al., "A Taxonomy for Key Escrow Encryption Systems", Communications of the ACM, Mar. 1996, vol. 39, No. 3, pp. 34-40; U.S.A.

Hoekstra et al., "Using Innovative Instructions to Create Trustworthy Software Solutions", in ISCA-HASP, Tel Aviv, Israel, 2013; http://css.csail.mit.edu/6.858/2015/readings/sgx.pdf.

Jefferies et al., "A Proposed Architecture for Trusted Third Party Services", Cryptography: Policy and Algorithms, Lecture Notes in Computer Science, vol. 1029, pp. 98-104, University of London Egham Hill, Egham, Surry, England, 2005, Springer; http://link.springer.com/chapter/10.1007/BFb0032349#page-1.

Mckeen et al., "Innovative Instructions and Software Model for Isolated Execution", ISCA-HASP, Tel Aviv, Israel, 2013; retrieved from the Internet <URL: https://software.intel.com/en-us/articles/innovative-instructions-and-software-model-for-isolated-execution>.

Intel Active Management Technology (Intel AMT); Start Here Guide, Section 1.1; https://software.intel.com/sites/default/files/m/2/1/f/f/a/43527-Intel_AMT8_Start_Here_Guide.pdf; Intel Corporation, U.S.A. 2011.

Rozas et al., "Intel Software Guard Extensions (Intel SGX)", retrieved from the Internet <URL: http://www.pdl.cmu.edu/SDI/2013/slides/rozas-SGX.pdf> published Nov. 6, 2013; Intel Corporation, U.S.A.

Waters et. al., "Building an Encrypted and Searchable Audit Log", 11th Annual Network and Distributed Security Symposium, 2004, retrieved from the Internet, <URL: http://www.parc.com/content/attachments/building_encrypted_searchable_5059_parc.pdf>, Jan. 9, 2004, Palo Alto Research Center, Palo Alto, California, U.S.A.

Johnson et. al., "Intel Software Guard Extensions: EPID Provisioning and Attestation Services", retrieved from the Internet <URL: https://software.intel.com/en-us/blogs/2016/03/09/intel-sgx-epid-provisioning-and-attestation-services> Mar. 9, 2016, Intel Corporation, U.S.A.

Park et. al., "Toward Live Migration of SGX-Enabled Virtual Machines", 2016 IEEE World Congress on Services Computing, Jun. 27-Jul. 2, 2016, The Affiliated Institute of ETRI, Daejeon, Republic of Korea.

International Search Report and Written Opinion (ISA/AU) dated Feb. 9, 2016 for International Patent Application PCT/US2016/061341 filed Nov. 10, 2016; 23 pages.

nShield Solo HSM's, www.thales-esecurity.com, Mar. 2017, U.S.A.

International Search Report and Written Opinion (ISA/AU) dated Aug. 1, 2017 for International Patent Application PCT/US2017/031034 filed May 4, 2017; 22 pages.

Written Opinion of the International Preliminary Examining Authority (IPEA/AU) dated Nov. 5, 2018 for International Patent Application PCT/US2016/061341 filed Nov. 10, 2016; 10 pages.

Li et al., "LIVE: Lightweight Integrity Verification and Content Access Control for Named Data Networking", IEEE Transactions on Information Forensics and Security, vol. 10; No. 2, Feb. 2015, U.S.A.

Rewagad et al., "Use of Digital Signature with Diffie Hellman Key Exchange and AES Encryption Algorithm to Enhance Data Security in Cloud Computing", 2013 International Conference on Communication Systems and Network Technologies, 2013, U.S.A.

Kohlas et al., "Reasoning about Public-Key Certification: On Bindings Between Entities and Public Keys", IEEE Journal on Selected Areas in Communications, vol. 18, No. 4, Apr. 2000, U.S.A.

Ugur et al., "A Framework for Licensed Digital Signatures", 2009 First International Conference on Networks & Communications, 2009, U.S.A.

International Preliminary Report on Patentability issued by the International Preliminary Examining Authority (IPEA/AU) dated

(56) References Cited

OTHER PUBLICATIONS

Mar. 12, 2019 for International Patent Application PCT/US2016/061341 filed Nov. 10, 2016; 37 pages.
Written Opinion of the International Preliminary Examining Authority (IPEA/AU) dated Apr. 1, 2019 for International Patent Application PCT/US2017/031034 filed May 4, 2017; 12 pages.
Sinha et al., "Continuous Tamper-proof Logging Using TPM 2.0", international Conference on Trust and Trustworty Computing (pp. 19-36), Springer, Cham., Jun. 2014.

* cited by examiner

Step 3.1.1: Generate on an external access entity device, a digital signature key pair 261, 262.

Action on External Access entity device
A 3.1

---

Step 3.2.1: Place in nonvolatile memory in device the values: Access verification public key 211, unique device identifier 212, platform signature key 214, platform verification key 216, and certificate for platform verification key 216.
Step 3.2.2: Implement the functionality for the following modules: access control module 210, access archive module 270, and the change control module 280.
Step 3.2.3: Implement the functionality for executing an authorized access payload 220 on the device 200.
Step 3.2.4: Place in nonvolatile memory in the device the description of the external access policy 213.

Action during device manufacturing A 3.2

---

Step 3.3.1: Prepare and digitally sign an access request 268.
Step 3.3.2: Send signed access request 269 to device 200.
Action by external access entity A 3.3

Step 3.4.1: Check validity of signed access request 269.
  If signed access request 269 is not valid, stop processing request and inform device.
  If signed access request 269 is valid, continue.
Step 3.4.2: Prepare authorized access payload 220.
Step 3.4.3: Record the authorized access payload 220 in the access archive module 270.
Step 3.4.4: Send authorized access payload to appropriate module on device 200.
Action by access control module A 3.4

Step 3.5.1: Process and perform the instructions in the authorized access payload 220
Step 3.5.2: Encrypt information to be sent to the external access entity.

Action by various modules in device 200
A 3.5

Figure 3

For each new day, T, perform:

Step 5.1.1: If the Seed_for_day(T) does not already exist in the CryptoSeed Table 247, generate Seed_for_day(T) using a random number generator.
Step 5.1.2: Delete Seed_for_day(T-MST)

A 5.1

---

Cryptographic module receives authorized access payload:

If the authorized access payload has a request for crypto seeds for future, the cryptographic module 240 precomputes and stores all of the future seeds that are requested and allowed.

Let T be the current day.
Step 5.2.1: Set k to be the maximum of {Max future access 251, m such that the seed for day T + m is the max day requested in the authorized access payload}
Step 5.2.2: For j = 1 , … , k, generate Seed_for_day(T+j) using a random number generator and store Seed_for_day(T+j) in the crypto seed table 247.

A 5.2

---

For each new day, perform:

Step 5.3.1: Generate Seed_for_day(T) = Pseudo_Random_Function (Seed_for_Day(T-1), "seed for next day")
Step 5.3.2: Generate Seed_for_day(T-MST+1) = Pseudo_Random_Function(Seed_for_day(T-MST), "seed for next day")
Step 5.3.3: Delete Seed_for_day(T-MST)

EXTERNAL ACCESSIBILITY FOR NETWORK DEVICES

RELATED APPLICATIONS

This patent application is a continuation-in-part (CIP) of commonly-owned U.S. patent Ser. No. 15/586,681 entitled "Assuring External Accessibility for Devices on a Network" filed May 4, 2017; furthermore, the subject matter of this application is related to that of U.S. patent application Ser. No. 15/348,210 entitled "Balancing Public and Personal Security Needs" filed Nov. 10, 2016, which application has the same inventor and owner as the present application; said U.S. Ser. No. 15/348,210 is hereby incorporated by reference in its entirety into the present application.

TECHNICAL FIELD

The present invention relates generally to computer security for individuals and corporations, and the often competing requirements of law enforcement to sometimes request access to personal information stored on computers.

BACKGROUND ART

There is prior art disclosing methods for a network access point to check whether a device requesting access to a network has authorization credentials to access the network. For example, the network access point may request a user name and password for a user of the device prior to granting access. In another example, a cell phone service provider may check to see if a cell phone has an account with Internet access privilege before providing Internet access to a cell phone.

U.S. patent application Ser. No. 15/348,210 filed Nov. 10, 2016 discloses a method for a computing device to allow access to authorized external access entities to user information on the computing device.

There is prior art (for example, Intel Manageability Engine, Intel Software Guard Extensions, Intel Trusted Execution Technology, Intel Authenticated Code Modules, and ARM trust zone) disclosing methods for executing a module in a partition of a computing device, and protecting that module from software executing outside that partition.

There is prior art disclosing the design and implementation of key escrow systems, wherein a key escrow agent is provided with cryptographic keys that can be used at any time to decrypt communications from a device.

Computing devices have been proposed that would allow for authorized law enforcement entities special privileges in unlocking the device, for decrypting messages communicated by the device, and/or for retrieving information stored or used on the device. A country or other political entity could require that all devices sold in that country conform to specified policies for authorized law enforcement access. But all countries may not have the same policies, and some countries may not cooperate with law enforcement entities of another country. The purpose of this invention is to present a method whereby a policy enforcing network access point can set a policy requirement for law enforcement access for any devices that it allows on a network, and then robustly verify whether a device meets this policy requirement before allowing the device on the network. With this invention, a country could set a law enforcement access policy requirement for devices that obtain Internet access within the country.

DISCLOSURE OF INVENTION

The present invention comprises methods and apparati for permitting Computing Devices 200 to safely accept Payloads 220 from External Access Entity Devices 260, and to safely access external Networks 710. In an apparatus embodiment, a Computing Device 200 contains an Access Control Module 210 comprising an Access Verification Public Key 211 and a Device Signature Key 214. The Access Control Module 210 is configured to verify authorization of an External Access Payload 220 by verifying a digital signature affixed to the Payload 220 using the Access Verification Public Key 211. The authorized External Access Payload 220 is then permitted to execute on the Computing Device 200. The Access Control Module 210 is also configured to receive from a Network Access Device 600 information associated with a Network 710 access request, and to create a plurality of digital signatures, using the Device Signature Key 214, that link said information associated with the Network 710 access request with the Access Verification Public Key 211.

BRIEF DESCRIPTION OF THE DRAWINGS

These and other more detailed and specific objects and features of the present invention are more fully disclosed in the following specification, reference being had to the accompanying drawings, in which:

FIG. 3 is an illustration of some of the functionality in an external entity accessible device 200.

FIG. 5 is an illustration of some of the functionality in cryptographic module 240.

DETAILED DESCRIPTION OF PREFERRED EMBODIMENTS

Figure 1:
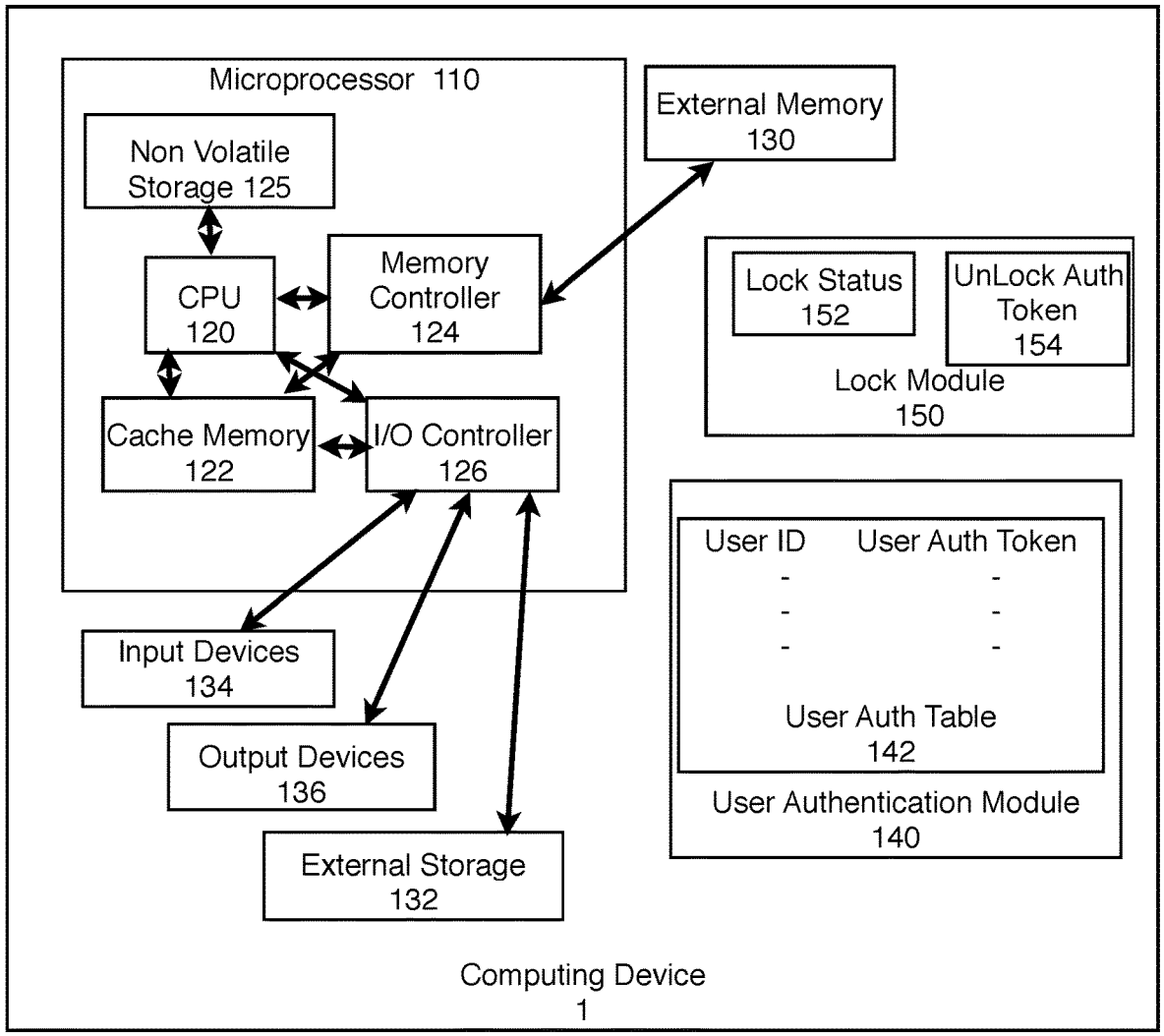
FIG. 1 is an illustration of a computing device 1 that can be used in conjunction with the present invention.
Figure 2:
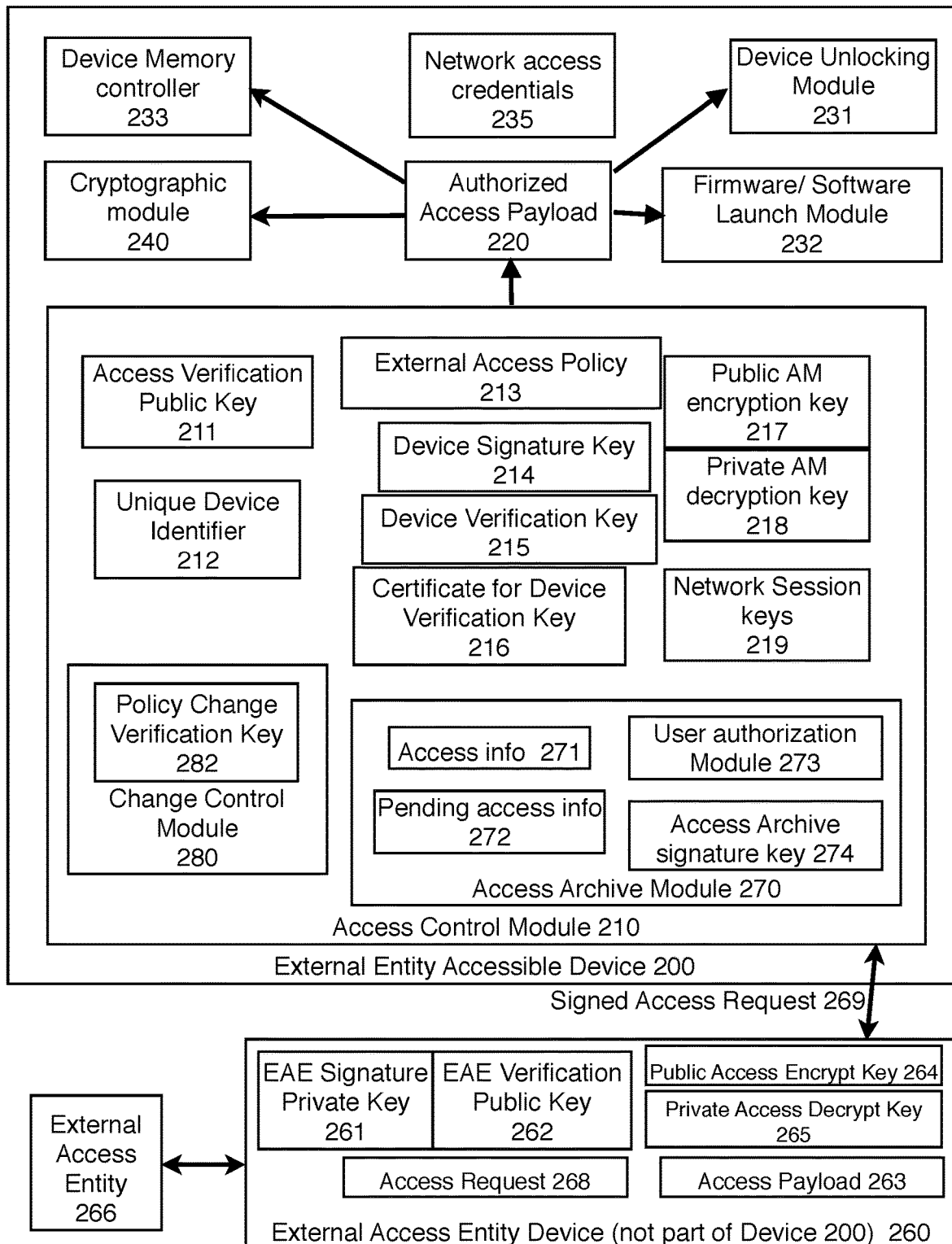
FIG. 2 is an illustration of an external entity accessible device 200 which is a computing device 1 with the functionality of allowing an authorized external entity to access the device 200.

FIGS. 1 and 2 illustrate a computing device 1 according to some embodiments. Computing device 1 may be a hand held smart phone, a tablet, a laptop, a desktop, or a server. The computing device 1 has one or more microprocessors 110. Each microprocessor 110 may comprise a CPU 120 to carry out the basic instructions of a computer program, cache memory 122 to store instructions and data inside the microprocessor 110, a memory controller 124 to access memory 130 that is external to the microprocessor 110, and an I/O Controller 126 to access other resources on the device 1, such as external non-volatile storage 132, one or more input devices 134, and one or more output devices 136. In some embodiments of the system, there are multiple microprocessors 110 in the device 1. In some embodiments of the system, some of the microprocessors 110 serve specific purposes, such as a graphics microprocessor 110. As shown in FIG. 2, computing device 1 comprises a multiplicity of modules, such as Access Control Module 210, Cryptographic Module 240, and Access Archive Module 270, for performing specified tasks. In some embodiments, a module is a set of hardware logic gates. In some embodiments, a module is a software program that includes instructions for the microprocessor 110 to perform, uses the memory 125, 122, 130 in the device 1 for storing and retrieving information and for communicating with other modules in the device 1, and uses the input and output capabilities 126, 134, 136 in the device 1 for communicating with other devices and users. It is standard routine software engineering to take a functional description of the desired features of a module, and to write a software program to execute on a computing device 1 and implement those features.

In some embodiments, computing device 1 includes a user authentication module 140. In some embodiments, the user authentication module 140 is implemented in software that executes on the microprocessor 110. The user authentication module 140 includes a user authentication table 142, which comprises a list of user ids, and for each user id, the user authentication token used by the user having that user id to authenticate the user when the user logs onto the system. Examples of user authentication tokens include passwords, movement patterns on an input device, and biometrics. In some embodiments, some users may have the privilege on the computing device 1 that allows the user to add additional users to the user auth table 142. In some embodiments, computing device 1 has a lock module 150 that comprises a lock status 152 which indicates whether the device 1 is locked or unlocked, and an unlock auth token 154, which is used to check whether a user is allowed to unlock the device 1 if the device is in a locked state. In some embodiments when a user is logged into the device 1, the user is able to set the unlock auth token 154. For a given user, the user may choose to make the unlock auth token 154 the same as the user auth token, or the user may choose a different auth token.

Throughout this specification, the term "user" refers to an entity that can successfully authenticate as one of the users listed in the user auth table 142, which may require unlocking the device 1 if device 1 is in the locked state. Two entities are considered the same user if they can authenticate with the same user id. A user may choose to have a null user auth token and unlock auth token. If a user has a null user auth token and unlock auth token, any entity with physical access to the device 1 can use the device 1 as that user, and therefore is considered to be the same user. In some embodiments, a user is not a human person, but is some other entity, for example, some other device 1.

FIG. 2 illustrates an embodiment of an external entity accessible device 200. An external entity accessible device 200 includes the properties of a computing device 1.

In some embodiments, the device 200 includes a cryptographic module 240. A user of the device 200 uses keys in this cryptographic module 240 to encrypt information for storage on the device 200 or for communication to other devices across some network.

The external entity accessible device 200 includes an access control module 210 that is used to control the access of external entities according to the external access policy 213 of the device 200, and to provide proof to a policy enforcing network access point or other entity of the external access capabilities and policy of the device 200.

FIG. 2 also illustrates an embodiment of an external access entity device 260 that is used by an external access entity 266 to digitally sign requests for access to an external entity accessible device 200. An external access entity 266 is some entity other than the user of the device 200.

FIG. 3 illustrates how the device 200 in FIG. 2 is used in an embodiment. Block A 3.1 illustrates a step that takes place prior to manufacturing of device 200. An external access entity device 260 generates a private/public key pair for a digital signature system, specifically an external access entity signature private key 261 and an external access entity verification public key 262.

Block A 3.2 illustrates steps that take place during manufacturing of device 200.

An access verification public key 211 is embedded in non volatile memory in the access control module 210. In one embodiment, the access verification public key is an external access entity verification public key 262. In another embodiment, the access verification public key 211 in the external entity accessible device 200 is a verification public key of a certificate authority that issues certificates for a plurality of external access entity verification public keys 262. In another embodiment, there are multiple access verification public keys 211 in the access control module 210.

Also in step 3.2.1, a unique device identifier 212 is generated and placed on the device 200. In some embodiments, device identifier 212 is chosen at random from a large enough set so that the probability of two devices 200 receiving the same device identifier 212 is extremely low. A digital signature key pair is generated for the device 200, specifically a private device signature key 214 and a public device verification key 215. A digital certificate 216 is generated for the device verification key 215. The certificate 216 is signed by the device manufacturer, and contains information about the device 200. In some embodiments, the certificate 216 is placed on the device 200. In other embodiments, the certificate 216 is placed in a directory that is not contained within device 200 but is accessible to device 200. In some embodiments, the device verification key 215 can also be used as a device identifier, instead of having a separate unique device identifier 212.

In step 3.2.2, the device manufacturer implements the functionality for the access control module 210, the Access Archive Module 270, and the change control module 280. This implementation may include hardware, firmware, and/or software by choice of the manufacturer. In step 3.2.3, the device manufacturer implements the functionality for executing an authorized access payload 220 on the device 200, including the capabilities needed in various components throughout the device 200 needed to execute the payload 220, such as in a device unlocking module 231, in a firmware and/or software launch module 232, in device memory controller 233, and/or in a plurality of cryptographic modules 240. This implementation may include hardware, firmware, and/or software by choice of the manufacturer.

In step 3.2.4, the device manufacturer stores in nonvolatile memory in the device 200 a description of the external access policy 213 of device 200. In some embodiments, the external access policy 213 is not stored on the device 200, but is stored elsewhere, and an identifier for the external access policy 213 is stored on the device 200. In some embodiments, this identifier for the external access policy 213 is identified in the certificate 216 for the device verification key 215. The external access policy 213 describes the types of payloads 220 that are allowed on the device 200. In one embodiment, the external access policy 213 allows any payload 220 that can be executed on the device 200. In some embodiments, the external access policy 213 describes what types of unlocking capabilities are available to an authorized external access entity 266. In some embodiments, the external access policy 213 describes the capabilities of the firmware or software that can be launched by an authorized external access entity 266. In some embodiments, the external access policy 213 describes what cryptographic keys are allowed to be requested in payloads 220. The external access policy 213 also describes the capabilities of the access archive module 270, and the change control module 280.

In some embodiments, the device 200 has multiple partitions for executing software, and enforces different policies on the different partitions regarding what software can execute and what external access is permitted. The description of these policies are included in the external access policy 213.

In some embodiments, no changes are allowed to the external access policy 213 or to any functionality in the device 200 that would invalidate any of the descriptions in the external access policy 213. In this case, a change control module 280 is not needed. In other embodiments, changes are allowed to the external access policy 213 and to the corresponding functionality in the device 200 that is included in the description of the external access policy 213. In this case, the change control module 280 controls the authorization for such changes. In these embodiments, no change is allowed in the external access policy 213 or to any functionality in the device 200 that is included in the description in the external access policy 213 unless that change is approved by the change control module 280.

In some embodiments, the access control module 210 is executed in a partition that is protected from other software executing on device 200. In this way, changes can be made to the functionality of software executing outside of the partition with the access control module 210 without needing approval from the change control module 280. In one embodiment, the access control module 210 executes on a separate microprocessor having its own memory and a secured launch of the access control module 210 software. In other embodiments, the access control module 210 executes in a trusted execution environment.

The next action in FIG. 3 is shown in block A 3.3. This action occurs after the external access entity 266 decides to access the device 200. In an anticipated use of this invention, the external access entity 266 is obligated to obtain legal authorization before using the capability to access the device 200. In step 3.3.1, the external access entity 266 prepares an access request 268 containing an access payload 263 and the unique device identifier 212 of the targeted device 200. In some embodiments, the external access entity device 260 generates an access encryption key pair, specifically, a public access encryption key 264 and a private access decryption key 265. The public access encryption key 264 is included in the access payload 263. The external access entity device 260 digitally signs this request 268 with the external access entity signature private key 261. In one embodiment, the signed access request 269 is provided directly to the device 200. In another embodiment, the signed access request 269 is provided to some other entity which provides it to device 200, perhaps at some future time. The future time may or may not be selected in advance.

In action A 3.4 in FIG. 3, the device 200 processes the received signed access request 269 in the access control module 210. In step 3.4.1, the access control module 210 checks the validity of the signed access request 269. The access control module 210 checks that the digital signature on the request 269 is valid using the access verification public key 211. This check may involve checking the digital signatures of digital certificates in a certificate hierarchy when the access verification public key 211 is the public key of a certificate authority. If this digital signature is valid, the access control module 210 also checks that the unique device identifier in the access request 268 matches the unique device identifier 212 of the device 200. If that check is valid, the access control module 210 also checks that the access payload 263 in the access request 268 is consistent with the external access policy 213 of the device 200. If the access request 268 fails any of these checks, the access control module 210 informs the device 200 that the access request is invalid. In some embodiments, that includes stopping the thread of execution of the access control module 210. If all of the checks pass, the access control module 210 proceeds to step 3.4.2, where the access control module 210 prepares an authorized access payload 220 derived from the access payload 263.

In some embodiments, the access control module 210 includes an access archive module 270. In Step 3.4.3, information about the authorized access payload 220 is stored in the access archive module 270. In some embodiments, this information is stored in access info 271, which is non volatile storage 125 available to the access archive module 270. In some embodiments, the access info 271 comprises the number of times that an authorized access payload 220 has been produced by access control module 210. In some embodiments, the access info 271 includes a hash chain derived from previous authorized access payloads 220. In some embodiments, any information from an authorized access payload 220 is not included in real time in access info 271, but is stored temporarily in pending access info 272, and added to access info 271 after the passage of some specified time. In some embodiments, upon a request, the access archive module 270 outputs the Access Info 271. In some embodiments, the Access Archive Module 270 also provides a digital signature of the access info 271 using an access archive signature key 274. In some embodiments, this signed message may also include the unique device identifier 212. In some embodiments, the user provides a randomly generated Nonce, and the access archive module 270 includes the Nonce in the signed message. In some embodiments, the access archive module 270 requires a successful user authentication, including a success message from a user authentication module 273 before access info 271 is released to any other module.

In Step 3.4.4, the authorized access payload 220 is sent from the access control module 210 to an appropriate recipient module on device 200. In step 3.5.1, the module that receives the authorized access payload 220 processes the authorized access payload 220, and performs the instructions in the authorized access payload 220. The following paragraphs describe several embodiments implemented by modules in the device 200 that receive an authorized access payload 220. For each of theses modules, processing the instructions in the authorized access payload 220 sometimes results in information that needs to be sent securely back to the external access entity 266. In Step 3.5.2, this information is encrypted using the public access encrypt key 264 and sent to the external access entity device 260.

In some embodiments, the authorized access payload 220 is sent to the device unlocking module 231, and the payload 220 contains instructions to modify the functionality of the device unlocking module 231 to allow an external access entity 266 to feasibly unlock the device 200 without knowing the device unlocking password chosen by the user of the device 200. In some embodiments, the authorized access payload 220 is sent to a firmware or software launch module 232, and payload 220 contains instructions to the firmware or software launch module 232 to launch different firmware or software than the module 232 normally would launch, or to modify the firmware or software that is launched on the device 200. In some embodiments, the authorized access payload 220 is sent to a device memory controller module 233, and payload 220 contains instructions to modify device 200 memory with respect to firmware or software that has already been launched on the device 220, or to retrieve data stored in device 200 memory. In some embodiments, the authorized access payload 220 places instructions in device 200 memory that are executed to retrieve information from device 200 memory and to provide that information to the external access entity 266.

In some embodiments, the authorized access payload 220 is sent to a cryptographic module 240, and payload 220 contains instructions to modify the functionality of the cryptographic module 240 on the device 200, so that the external access entity 266 is able to decrypt messages encrypted with a cryptographic key used in the cryptographic module 240.

Figure 4:
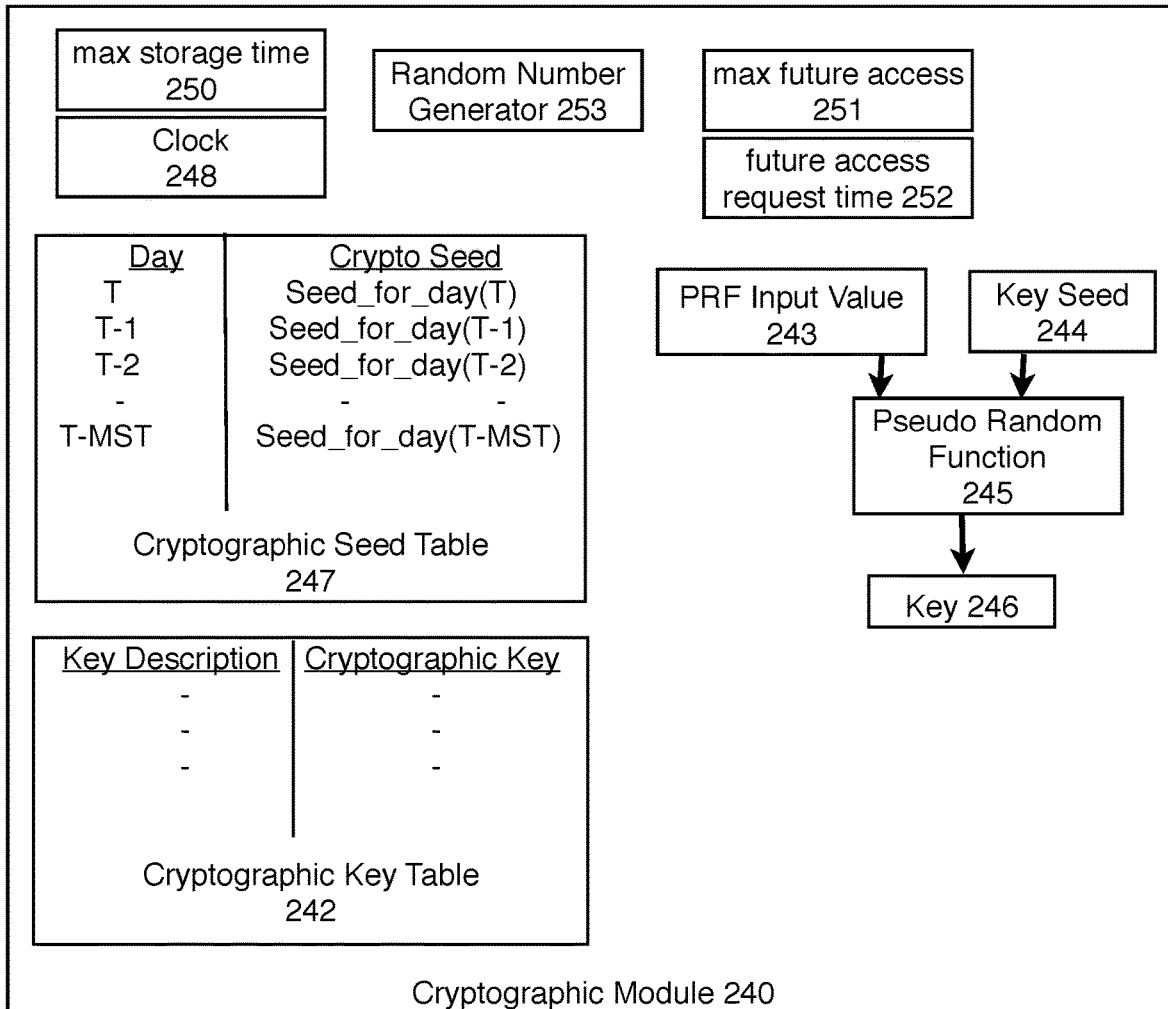
FIG. 4 is an illustration of more detail of the cryptographic module 240 in an external entity accessible device 200.

FIG. 4 provides a more detailed view of the cryptographic module 240. In some embodiments, the cryptographic module 240 has a plurality of keys stored in a cryptographic key table 242, each key having an index or key description. In some embodiments, the authorized access payload 220 includes a key description, and the cryptographic module 240 responds with the corresponding cryptographic key in table 242 if there is a matching key with that description.

In some embodiments, the cryptographic module 240 contains a cryptographic pseudo random function 245, which takes as input a key seed 244, and another PRF input value 243, and produces a key 246. In one embodiment, the key seed 244 is kept constant for some period of time, and the PRF input value 243 is derived from the key description for each key. In this embodiment, the cryptographic module 240 provides the external access entity 266 with the key seed 244. By using the key seed 244 and the PRF input value 243, the external access entity 266 can compute any cryptographic key in the cryptographic key table 242 for the period of time when the same key seed 244 is in use for which the external access entity 266 knows the key description, and thus knows the PRF input value 243.

In some embodiments, the cryptographic module 240 has access to a clock 248. In some embodiments, it is desirable for this to be a secure clock 248, so that the clock 248 is synced with a trusted time source periodically or whenever the clock 248 loses power.

FIG. 5 illustrates one embodiment of the use of cryptographic seeds 244 for generating and storing keys used in the cryptographic module 240. The description in FIG. 5 uses a time period of a day, but other time periods are used in other embodiments. There is a maximum storage time (MST) 250 stored in the cryptographic module 240. There is a cryptographic seed table 247 for storing the key seeds 244 for each day.

For each new day T, the cryptographic module 240 performs action A 5.1. In step 5.1.1, the cryptographic module 240 checks to see if it already has a crypto seed 244 for day T stored in the crypto seed table 247. If not, it generates a seed 244 for the day T and adds it to the crypto seed table 247 as Seed_for_day(T). In step 5.1.2, the cryptographic module 240 deletes the Seed_for_Day(T−MST). In this embodiment, the authorized access payload 220 can include a request for the entries in the crypto seed table 247 for seeds 244 for the day for numerous days, including the current day and days in the past. The cryptographic module 240 can provide the seeds 244 for the requested days, but not any day prior to the current day minus the maximum storage time 250.

In some embodiments, the cryptographic module 240 allows the external access entity 266 to receive crypto seeds 244 that will be used in the future. The cryptographic module 240 has a limit, the maximum future access 251, on how far in the future it will provide crypto seeds 244. This embodiment is described in action A 5.2. Suppose that the cryptographic module 240 has received an authorized access payload 220 that requests crypto seeds 244 that will be used in the future. The cryptographic module 240 generates the requested seeds 244 and stores them in the crypto seed table 247. Let M be the maximum of the set {m such that the seed for day T+m is requested in the authorized access payload 220}. Step 5.2.1 computes k as the maximum of M and max future access 251. Step 5.2.2 generates the Seed_for_day (T+j) for each j starting with 1, and up to k. These seeds 244 are generated using a random number generator 253, and are stored in the crypto seed table 247.

FIG. 5 also illustrates an alternate embodiment for the use of cryptographic seeds 244 in generating and storing keys used in the cryptographic module 240. This is described in action A 5.3. In one embodiment, for each new day T, in step 5.3.1, the cryptographic module 240 generates a new Seed_for_ Day (T) 247 using the Pseudo_random_function 245 by using the previous day's seed, Seed_for_Day(T−1) as the key seed 244, and the name "seed for next day" as the Pseudo_random_function input value 243. In this embodiment, the cryptographic module 240 needs to store only the values of the seed_for_day(T) and Seed_for_Day (T−MST+ 1) in the table 247. This is because any of the missing seeds between T and T−MST+1 can be recomputed starting with the Seed_for_Day(T−MST+1), since the Pseudo Random Function 245 is known, and the PRF input value="seed for next day" is known.

For the new day T, the cryptographic module 240 computes in step 5.3.2 the new value of Seed_for_Day (T−MST+1) using the Pseudo_random_function 245, by using the day T−MST seed, Seed_for_Day(T−MST) as the key seed 244, and the name "seed for next day" as the Pseudo_random_function input value 243 In this embodiment, if the authorized access payload 220 includes a request for the seed for day T−k for some value of k<MST, the cryptographic module 240 computes that seed 244, and provides it to the external access entity 266. The external access entity 266 can compute the key seed 244 for each day starting with day T−k. The external access entity 266 can also compute key seeds 244 into the future.

In one embodiment, it is desirable to have a limit on the number of days in the future for the external access entity 266 to have access. In this embodiment, there is a value in the cryptographic module 240 called max future access 251 for the maximum number of days in the future for which key seeds 244 can be provided. In the authorized access payload 220, there is an additional value, the future access request time 252. After a period of time has passed since the external access request was validated, so that the current day T is larger than the minimum of {future access request value 252, max future access value 251}, the cryptographic module 240 generates the seed_for_day (T) using a random number generator that is independent of the seeds 244 for any previous days. In this manner, the external access entity 266 is not able to obtain access to the keys in the future beyond day T for this cryptographic module 240 without making another access request.

In one embodiment, the cryptographic module 240 mixes in additional randomness into the seeds 244. In one embodiment, this is performed every 100th day. Every 100th day, instead of performing the step 5.3.1, the cryptographic module 240 generates Seed_for_day(T) using a random number generator. The Seed_for_day(T) generated using a random number generator is stored in the cryptographic seed table 247 until it is deleted in step 5.3.3 because MST additional days have passed. The Seed_for_day(T) generated using a random number generator is not regenerated in step 5.3.2.

In some embodiments, the time period of a day is replaced by some other time period.

In some embodiments, the device 200 encrypts information using the public access encrypt key 264 prior to sending that information to the external access entity 266.

In some embodiments, the access request 268 is encrypted.

In some embodiments, functionality in the cryptographic module 240 is protected from modification from any software that can be installed on device 200. In some embodiments, the cryptographic module 240 is executed in a partition that is resistant to software modifications.

Figure 6:
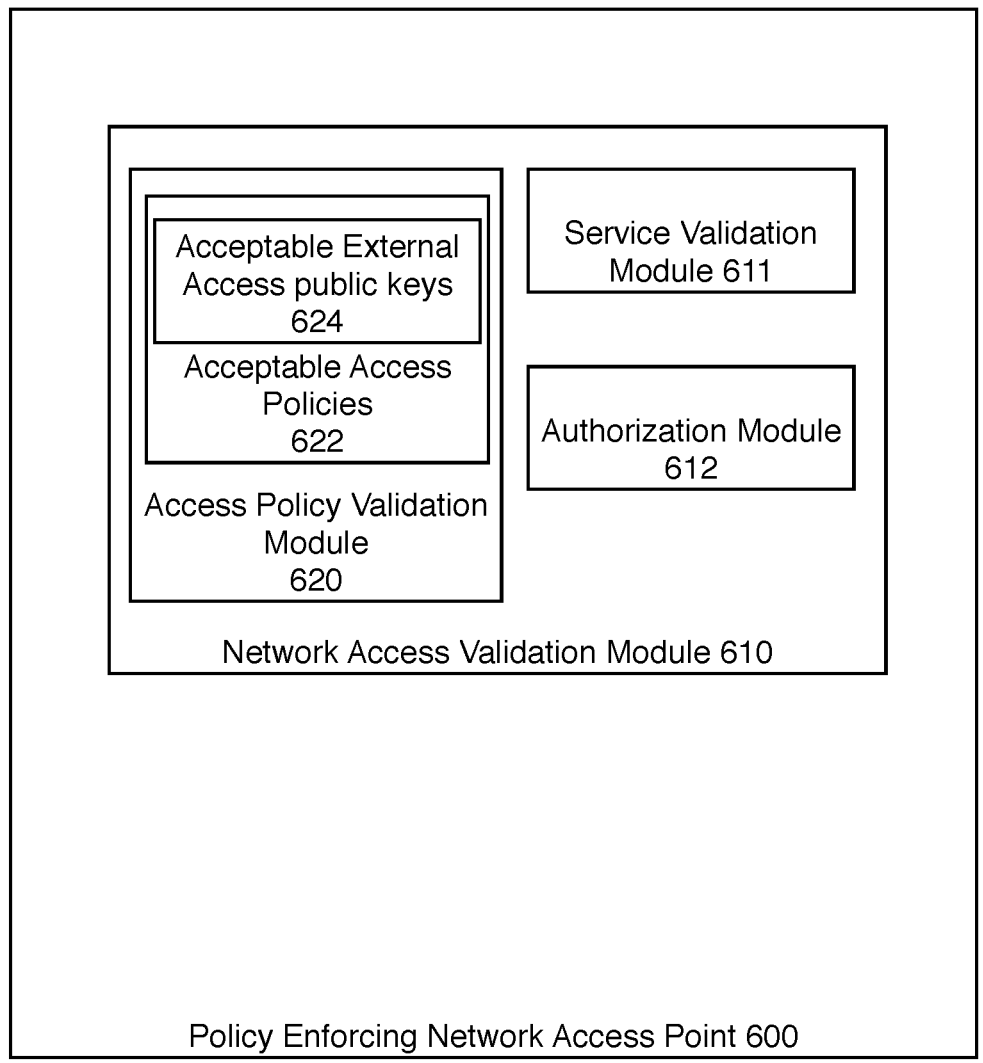
FIG. 6 is an illustration of a policy enforcing network access point 600 that checks the external accessibility of a device 200 before allowing the device 200 access to a network.
Figure 7:
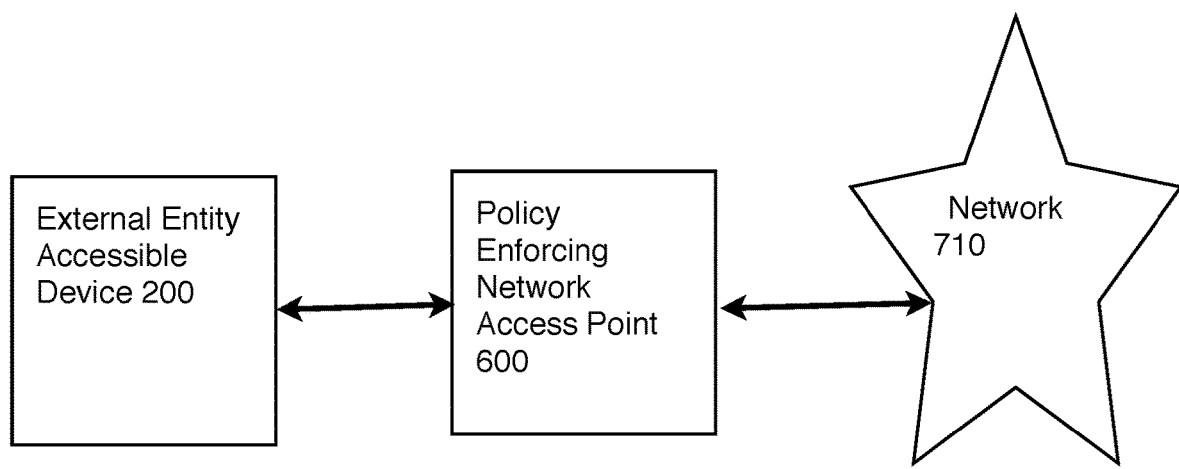
FIG. 7 is an illustration of an external entity accessible device 200 accessing a network 710 through a policy enforcing network access point 600.

FIG. 6 shows an embodiment of a policy enforcing network access point 600. As shown in FIG. 7, the policy enforcing network access point 600 provides a service to connect a device 200 to some network 710, such as the Internet. The policy enforcing network access point 600 includes a network access validation module 610 that makes a decision about whether to allow a device 200 to connect to some network 710. In some embodiments, the network access validation module 610 contains a service validation module 611 that checks whether a computing device 200 has a valid service agreement. For example, if the policy enforcing network access point 600 were a wireless access point owned by a cellular wireless carrier, the service validation module 611 may check whether the device 200 requesting service had a valid service agreement with the cellular wireless carrier. In some embodiments, the network access validation module 610 contains an authorization module 612, that checks whether a computing device 200 has credentials that allow it to connect to some network 710. For example, a policy enforcing network access point 600 in a home may have a WIFI password, and the policy enforcing network access point 600 may check that a computing device 200 knows this WIFI password.

In an embodiment of the current invention, the network access validation module 610 contains an access policy validation module 620 that checks whether a computing device 200 has a satisfactory capability for providing an external entity to access the computing device 200. The access policy validation module 620 contains a set of acceptable external access public keys 624. In some embodiments, this set 624 contains public keys of certificate authorities and a description of the types of digital certificates issued by those certificate authorities that are acceptable. In such an embodiment, a public key in a certificate that was issued by one of those certificate authorities and of an acceptable type is considered to be in the set of acceptable external access public keys 624. The access policy validation module 620 also contains a set of acceptable access policies 622. Some acceptable external access public keys 624 are Any_Policy_AEAPK. Specifically, any external access policy 213 on a device 200 where the access verification public key 211 is one of the Any_Policy_AEAPK is an acceptable access policy 622. Other acceptable external access public keys 624 are Not_Any_Policy_AEAPK. For an Not_Any_Policy_AEAPK, the acceptable access policies 622 includes information to determine whether an external access policy 213 on a device 200 where the access verification public key 211 is one of the Not_Any_Policy_AEAPK is an acceptable access policy 622.

Figure 8:
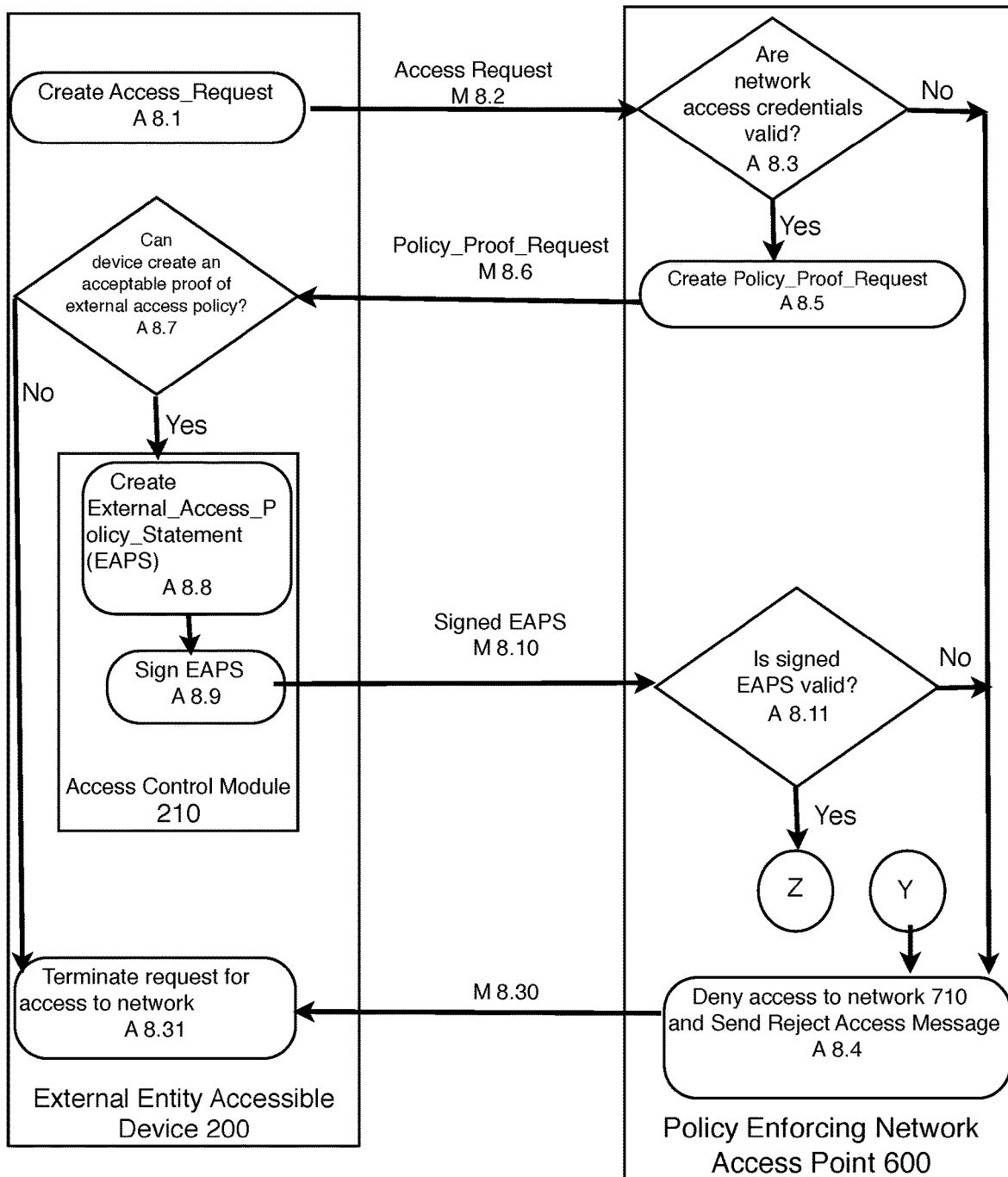
FIG. 8 is an illustration of the first steps of a protocol for an external entity accessible device 200 to obtain access to a network 710 through a policy enforcing network access point 600.

FIG. 8 presents an embodiment of a protocol for how a policy enforcing network access point 600 uses its capabilities to determine if a computing device 200 is allowed access to a network 710 accessible by the policy enforcing network access point 600.

In action A 8.1, a computing device 200 creates an Access_Request to start the process of gaining access to the network 710 through the policy enforcing network access point 600. In some embodiments, the Access_Request includes the device ID 212 of the device 200 and network access credentials 235 of the device 200.

In message M 8.2, the device 200 sends the Access_Request to the policy enforcing network access point 600 to request access to the network 710. In some embodiments, the access request message M 8.2 and other communications between the device 200 and the policy enforcing network access point 600 use network session keys 219 with common cryptographic protocols for security. In some embodiments, a protocol such as TLS is used to provide for privacy of the communications, and to assure that all of the communications are from the same device 200. In some embodiments, some of the session keys 219 used for secure communications are held securely in the access control module 210 of the device 200, so that the communication session cannot be feasibly transferred to another device. The session keys 219 are also used as an indicator that the device 200 is in an active communication session with a policy enforcing network access point 600. The session keys 219 are deleted when the device 200 terminates the communication session with the policy enforcing network access point 600.

The policy enforcing network access point 600 receives the Access_Request, and in action A 8.3 evaluates the network access credentials 235 to determine if credentials 235 are valid. In some embodiments, the access request and evaluation of network access credentials 235 may involve multiple messages between the device 200 and the policy enforcing network access point 600. In some embodiments, the evaluation of the network access credentials 235 at action A 8.3 includes an evaluation by the service validation module 611 to determine if the device 200 has a valid service contract for accessing network 710. In some embodiments, the evaluation of the network access credentials 235 includes an evaluation by the authorization module 612 to see if device 200 has authorization for accessing network 710. If the policy enforcing network access point 600 determines that the network access credentials 235 are not valid, the policy enforcing network access point 600 proceeds to action A 8.4 to send a reject access message M 8.30 to device 200, and to deny device 200 access to the network 710. If the policy enforcing network access point 600 determines that the network access credentials 235 are valid, the policy enforcing network access point 600 proceeds to action A 8.5.

In action A 8.5, policy enforcing network access point 600 creates a Policy_Proof_Request. This is a request for the access control module 210 of device 200 to provide a proof of the external access policy 213 of device 200, so that the policy enforcing network access point 600 is able to determine in action A 8.11 whether the external access policy 213 of the device 200 satisfies the acceptable access policies 622 of the policy enforcing network access point 600. In some embodiments, the Policy_Proof_Request includes a NONCE (a random value generated by the policy enforcing network access point 600) and a description of acceptable external access policies 622. In some embodiments, the Policy_Proof_Request is digitally signed by the policy enforcing network access point 600.

The Policy_Proof_Request is sent to device 200 in message M 8.6.

In action A 8.7, the device 200 evaluates the Policy Proof Request to determine if the device 200 can create an acceptable proof. In some embodiments, action A 8.7 is performed in the access control module 210 of device 200. In other embodiments, action A 8.7 is performed in other modules of device 200. If the device 200 determines that it cannot create an acceptable proof of satisfying the external access policy, the device 200 proceeds to action A 8.31, and terminates the request for access. Otherwise the device 200 proceeds to action A 8.8 to create the External_Access_Policy_Statement.

In action A 8.8, the access control module 210 of device 200 creates an External_Access_Policy_Statement (EAPS). In one embodiment, the External_Access_Policy_Statement includes: the NONCE sent in the Policy_Proof_Request; unique device identifier 212; a description or identifier of parts of the external access policy 213 of the device 200; an access verification public key 211 in the access control module 210 of device 200; and a public encryption key 217 corresponding to a private decryption key 218 controlled by the access control module 210. In some embodiments, the External_Access_Policy_Statement includes one or more of the following items: the NONCE sent in the Policy_Proof_Request; a cryptographic hash of the Policy_Proof_Request; the unique device identifier 212; a description or identifier of parts of the external access policy 213 of the device 200; an access verification public key 211 in the access control module 210 of device 200; an assertion that the external access policy 213 in device 200 meets the description of acceptable external access policies 622 sent in the Policy_Proof_Request; and a public Access Module encryption key 217 corresponding to a private Access Module decryption key 218 controlled by the access control module 210. In some embodiments, the digital certificate 216 for the device verification key 215 references some of the items listed above: the unique device identifier 212; a description or identifier of parts of the external access policy 213 of the device 200; and an access verification public key 211 in the access control module 210 of device 200. There is no requirement to duplicate items in the certificate 216 and in the EAPS.

The access control module 210 of device 200 proceeds to action A 8.9. In action A 8.9, the access control module 210 of device 200 digitally signs the External_Access_Policy_Statement with the device signature key 214. In some embodiments, the access control module 210 stores the EAPS while the device 200 is in the communication session with the policy enforcing network access point 600.

In message M 8.10, the external entity accessible device 200 sends the External_Access_Policy_Statement, the digital signature of the External_Access_Policy_Statement, and the digital certificate 216 for the device 200 verification key 215 to the policy enforcing network access point 600. In some embodiments, the policy enforcing network access point 600 obtains the certificate 216 through some other means, and therefore said certificate 216 doesn't need to be included in message M 8.10.

The combination of the EAPS, the digital signature on the EAPS by the device signature key 214, the digital certificate for the device verification key 216, and message M 8.10 link information associated with the Access_Request and the device verification public key 215. Information associated with the Access_Request includes the NONCE, the cryptographic hash of the Policy_Proof_Request, and the use of the TLS session keys 219 for sending message M 8.10.

In Action A 8.11, the policy enforcing network access point 600 checks the validity of the External_Access_Policy_Statement and the digital signature on the External_Access_Policy_Statement. In some embodiments, this checking includes: validating a digital certificate 216 for the device verification key 215; validating the digital signature on the External_Access_Policy_Statement using the device verification key 215; checking that the NONCE in the External_Access_Policy_Statement is the same as the NONCE sent to the device 200 in the Policy_Proof_Request; having the access policy validation module 620 check whether the access verification public key 211 is in the set of acceptable external access public keys 624; and checking that the external access policy 213 is in the set of acceptable access policies 622. If any of these checks fail, the policy enforcing network access point 600 proceeds to action A 8.4 to send a reject access message M 8.30 to device 200, and to deny device 200 access to the network 710. If all of the checks pass, this indicates that the device 200 has established satisfaction with the acceptable access policies 622, and the policy enforcing network access point 600 proceeds to action A 8.12 (see FIG. 9).

Figure 9:
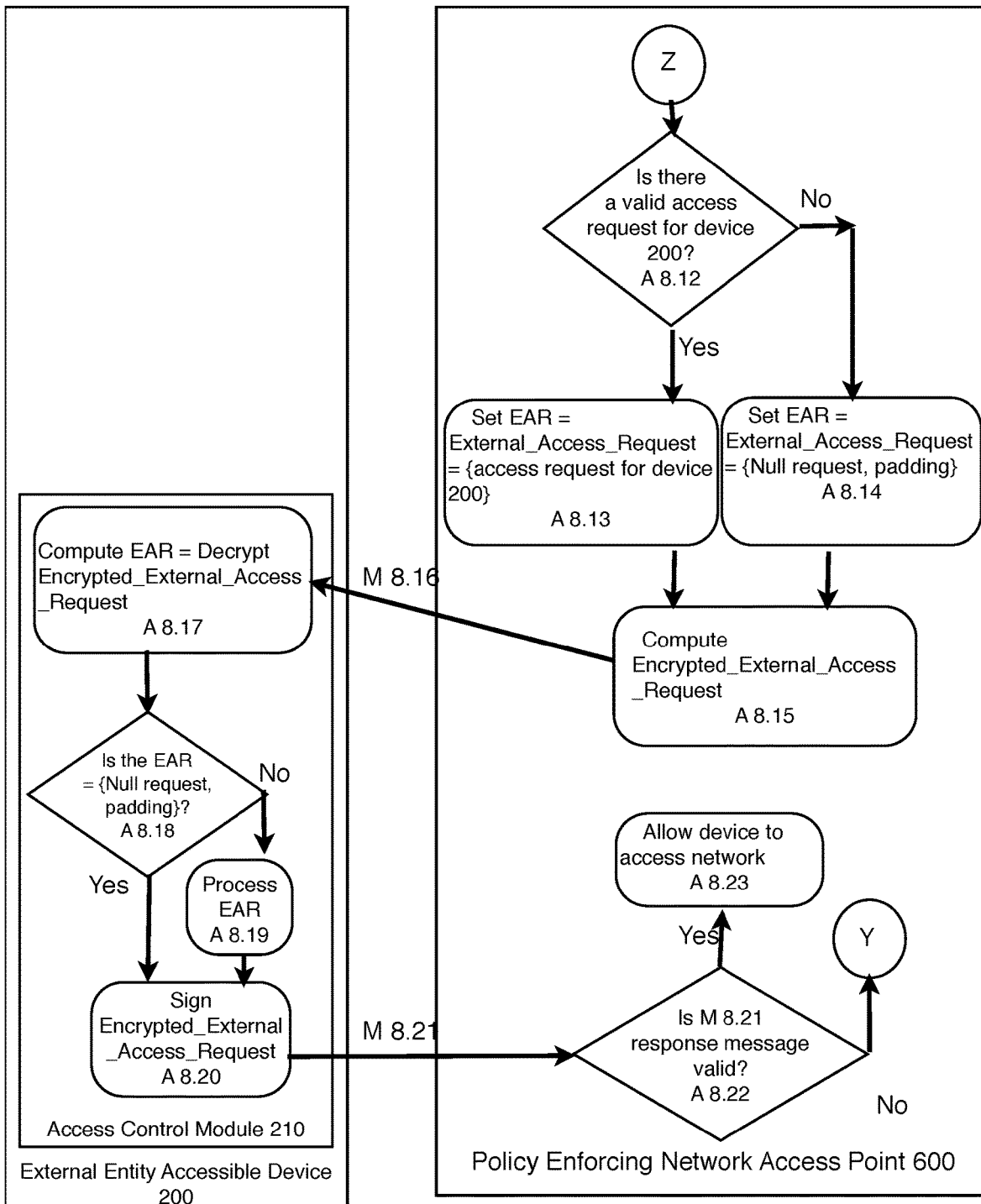
FIG. 9 is an illustration of the continuation of the protocol illustrated in FIG. 8.

In the Figures, action A 8.12 appears at the top of FIG. 9. In Action A 8.12, the policy enforcing network access point 600 checks to see if there is a valid request for access for device 200. In some embodiments, checking that a request for access is valid includes checking that the request includes the unique device identifier 212, and that the request has a digital signature that can be verified by the device embedded verification public key 211. In some embodiments, checking that a request for access is valid includes checking whether there is a time window for validity of the request, and whether the current time is within that time window. In some embodiments, the policy enforcing network access point 600 uses the unique device identifier 212 to search for such a request. In some embodiments, the policy enforcing network access point 600 searches a database where access requests are stored. In some embodiments, the policy enforcing network access point 600 contacts another entity to find out if there are any access requests for device 200. If the policy enforcing network access point 600 finds an access request for device 200, and a digital signature on the access request can verified by the access verification public key 211, the policy enforcing network access point 600 proceeds to action A 8.13 and sets the value of External_Access_Request to be that access request and the digital signature on the access request. If the policy enforcing network access point 600 does not find a properly signed access request for device 200, the policy enforcing network access point 600 proceeds to action A 8.14, and sets the value of External_Access_Request to be Null request. In some embodiments, the Null request is padded with sufficient random bits so that the length of the External_Access_Request is the same whether or not it was computed in action A 8.13 or action A 8.14.

The policy enforcing network access point 600 proceeds to action A 8.15, and computes the encryption of the External_Access_Request with the public AM encryption key 217. In some embodiments, a known cryptographic protocol is used for this encryption, such as generating a symmetric key SYM_KEY, encrypting the External_Access_Request with SYM_KEY using a symmetric encryption algorithm such as AES, and encrypting SYM_KEY with the public AM encryption key 217.

The policy enforcing network access point 600 sends the Encrypted_External_Access_Request to the device 200 in message M 8.16.

In action A 8.17, the access control module 210 of device 200 computes the External_Access_Request (EAR) by decrypting the Encrypted_External_Access_Request using the private AM decryption key 218.

The access control module 210 proceeds to action A 8.18, where module 210 checks to see if the External_Access_Request is the Null request or not.

If the External_Access_Request is the Null request, the access control module 210 proceeds to action A 8.20.

If the External_Access_Request is not the Null request, the access control module 210 proceeds to action A 8.19 where it processes the External_Access_Request. Processing the External_Access_Request was described earlier in this specification in the description of FIGS. 2, 3, 4, and 5. After the access control module 210 has completed processing the External_Access_Request, the access control module 210 proceeds to action A 8.20.

In action A 8.20, the access control module 210 digitally signs the Encrypted_External_Access_Request with the device signature key 214. In some embodiments, the message signed in action A 8.20 is a message computed from some portion of the External_Access_Request.

In message M 8.21, the device 200 sends the digital signature of the Encrypted_External_Access_Request to the policy enforcing network access point 600. In some embodiments, message M 8.21 also includes the Encrypted_External_Access_Request.

In action A 8.22, the policy enforcing network access point 600 checks validity of the message M 8.21. In some embodiments, this includes validating the digital signature on the Encrypted_External_Access_Request. In some embodiments, this checking includes: validating a digital certificate 216 for the device verification key 215; and validating the digital signature on the Encrypted_External_Access_Request using the device verification key 215. If the response message M 8.21 fails the validity checks, the policy enforcing network access point 600 proceeds to action A 8.4 (see FIG. 8), sends a reject access message M 8.30 to the device 200, and denies device 200 access to the network 710.

If the policy enforcing network access point 600 successfully validates the message M 8.21, the policy enforcing network access point 600 proceeds to action A 8.23, and allows the device 200 access to the network 710.

If the device 200 receives a reject access message as illustrated in message M 8.30, the device 200 terminates its request to access network 710.

In some embodiments, the process described in FIG. 9 is repeated periodically while the device 200 is connected to the network 710. In some embodiments, the process described in FIG. 9 is repeated if the policy enforcing network access point 600 receives a valid access request while the device 200 is connected to the network 710. In some embodiments, the device 200 is allowed to remain connected to the network 710 while the process described in FIG. 8 is performed, and if the check performed on message M 8.21 in action 8.22 of the validity of the response message fails, the device 200 access to the network 710 is terminated.

In some embodiments, there are no changes allowed to the access control module 210 during a connectivity session with the network access device 600, when such a change affects the validity of the External_Access_Policy_Statement signed and provided to the policy enforcing network access point 600 in message M 8.10 shown in FIG. 8.

Figure 10:
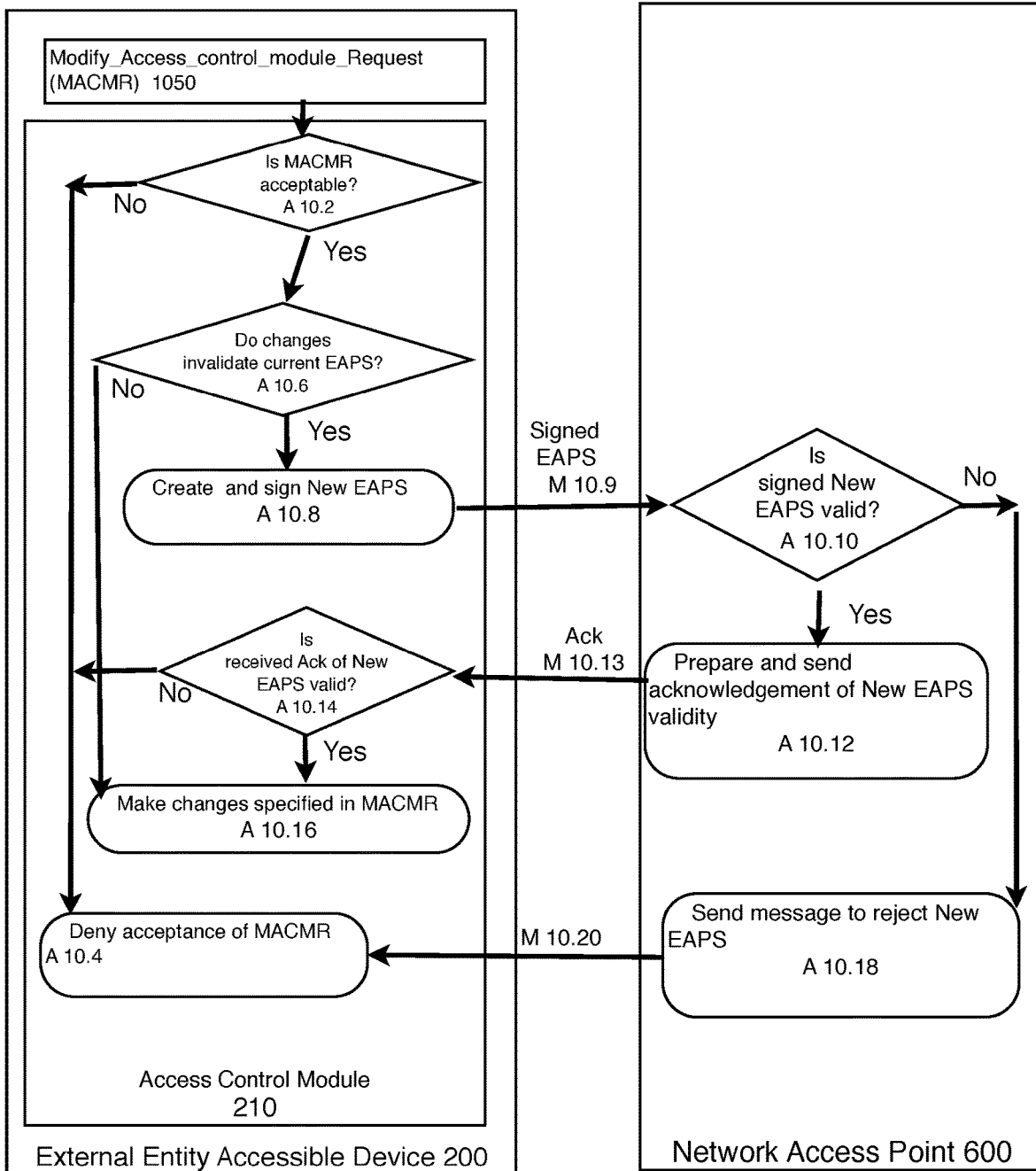
FIG. 10 is an illustration of a protocol for an external entity accessible device 200 to update the access control module 210 while in a communication session with policy enforcing network access point 600.

In some embodiments, the change control module 280 does allow changes in the access control module 210 during a connectivity session with the network access device 600, even when such a change affects the validity of the External_Access_Policy_Statement signed and provided to the policy enforcing network access point 600 in message M 8.10s. FIG. 10 illustrates such an embodiment.

A Modify_Access_control_module_request (MACMR) is created in block 1050. In one embodiment, the MACMR is digitally signed by a policy change signature key, which is the digital signature key portion of a digital signature key pair corresponding to a policy change verification key 282 which is in the change control module 280. The MACMR and digital signature are sent to the change control module 280.

In action A 10.2, the change control module 280 checks whether the MACMR is acceptable. In one embodiment, this acceptability check includes checking whether the digital signature on the MACMR is valid, using the policy change verification key 282. In one embodiment, the acceptability check is different if the device 200 is currently in a session with a policy enforcing network access point 600. If the acceptability checks do not pass, in action A 10.4 the access control module 210 does not make any changes, and responds to the MACMR with a deny acceptance response. If the acceptability checks do pass, the access control module 210 continues to action A 10.6.

In action A 10.6, the change control module 280 checks to see if the device 200 is in a current session with a policy enforcing network access point 600, and if so, examines the current EAPS that was signed in action A 8.9. If the changes requested in the MACMR do not invalidate the EAPS, or if the device 200 is not currently is a session with a policy enforcing network access point 600, the access control module 210 proceeds to action A 10.16, and makes the changes requested in the MACMR, including any necessary changes to the external access policy 213. If the changes requested in the MACMR do invalidate the current EAPS, the access control module 210 proceeds to action A 10.8.

In action A 10.8, the access control module 210 creates a new EAPS consistent with the MACMR. The access control module 210 digitally signs the new EAPS with the device signature key 214.

In message M 10.9, the external entity accessible device 200 sends the new EAPS and the digital signature of the new EAPS to the policy enforcing network access point 600. In some embodiments, the message M 10.9 includes a digital certificate 216 for the device verification key 215.

In action A 10.10, the policy enforcing network access point 600 checks the validity of the EAPS and the digital signature on the EAPS. If these validity checks do not pass, the policy enforcing network access point 600 proceeds to action A 10.18 to send a message M 10.20 to the device 200 indicating that the policy enforcing network access point 600 did not accept the new EAPS. If these validity checks do pass, the policy enforcing network access point 600 proceeds to action A 10.12.

In action A 10.12, the policy enforcing network access point 600 prepares an acknowledgement (Ack) of acceptance of the new EAPS. In message M 10.13, this Ack is sent to the access control module 210.

In action A 10.14, the access control module 210 checks if the received Ack is valid. If the received Ack is valid, the access control module 210 proceeds to action A 10.16, and makes the changes requested in the MACMR, including any necessary changes to the external access policy 213. If the received Ack is not valid, the access control module proceeds to action A 10.4.

In action A 10.4, the access control module 210 does not make any changes, and responds to the MACMR with a deny acceptance response.

The storage of keys in a cryptographic key table 242, and access provided to external access entity 266 to enable external access entity 266 to decrypt messages encrypted with keys in the cryptographic key table 242, are described above in conjunction with FIG. 4. In some embodiments, the key description in cryptographic key table 242 includes the date and time that the corresponding key in the key table 242 was used. In some embodiments, the payload provides a range of dates and times for which external access entity 266 is allowed to decrypt messages. In some embodiments, cryptographic module 240 provides to the external access entity 266 only keys in cryptographic key table 242 that are in the range of dates and times provided in the payload. In some embodiments, the payload states that external access entity 266 is allowed to receive keys of a certain type (for example, keys used in external communication) for a period of time in the future (for example, 30 days). In this case, cryptographic module 240 provides the keys of that type used during that time period to external access entity 266. In some embodiments, cryptographic module 240 deletes a key in cryptographic key table 242 when a key has been stored for longer than the maximum storage time 250.

Functionality of the cryptographic module 240, and the creation and use of stored cryptographic keys and crypto seeds in a cryptographic key table 242 and a cryptographic seed table 247, are also described above in conjunction with FIG. 4. In some embodiments, it may be desirable to have these tables stored encrypted, so that they cannot be discovered by an adversary attacking the computing device 1.

Figure 11:
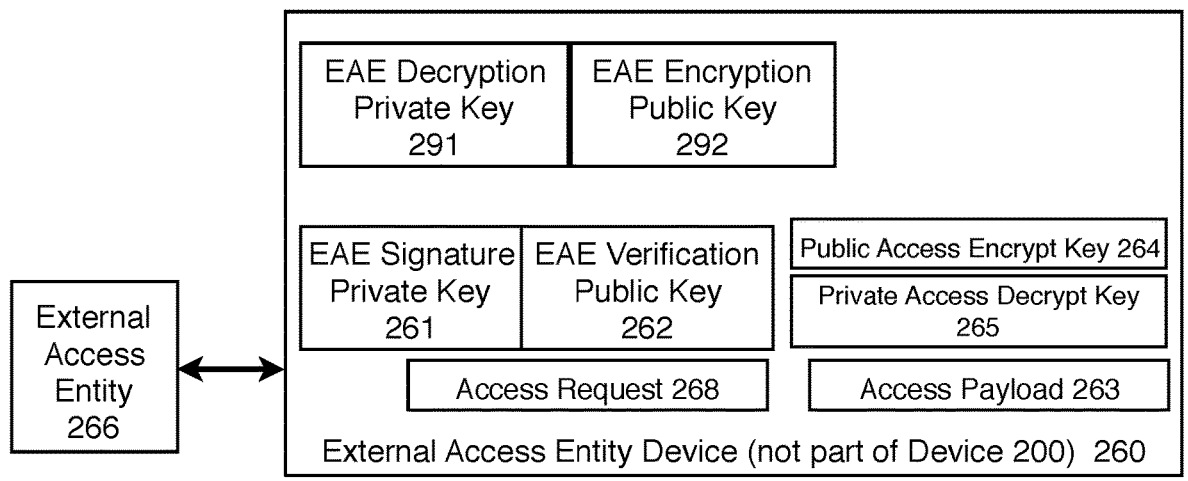
FIG. 11 is an illustration of the addition of the addition of a key pair 291 and 292 to the external access entity device 260 introduced in FIG. 2.

FIG. 11 shows an addition of an encryption/decryption key pair for external access entity 266: an external access entity decryption private key 291, and an external access entity encryption public key 292. This key pair is generated on the external access entity device 260. In some embodiments, the key pair 291, 292 may be generated and/or used by some other device. In some embodiments, the key pair 291, 292 may be generated and/or used by some entity other than external access entity 266.

Figure 12:
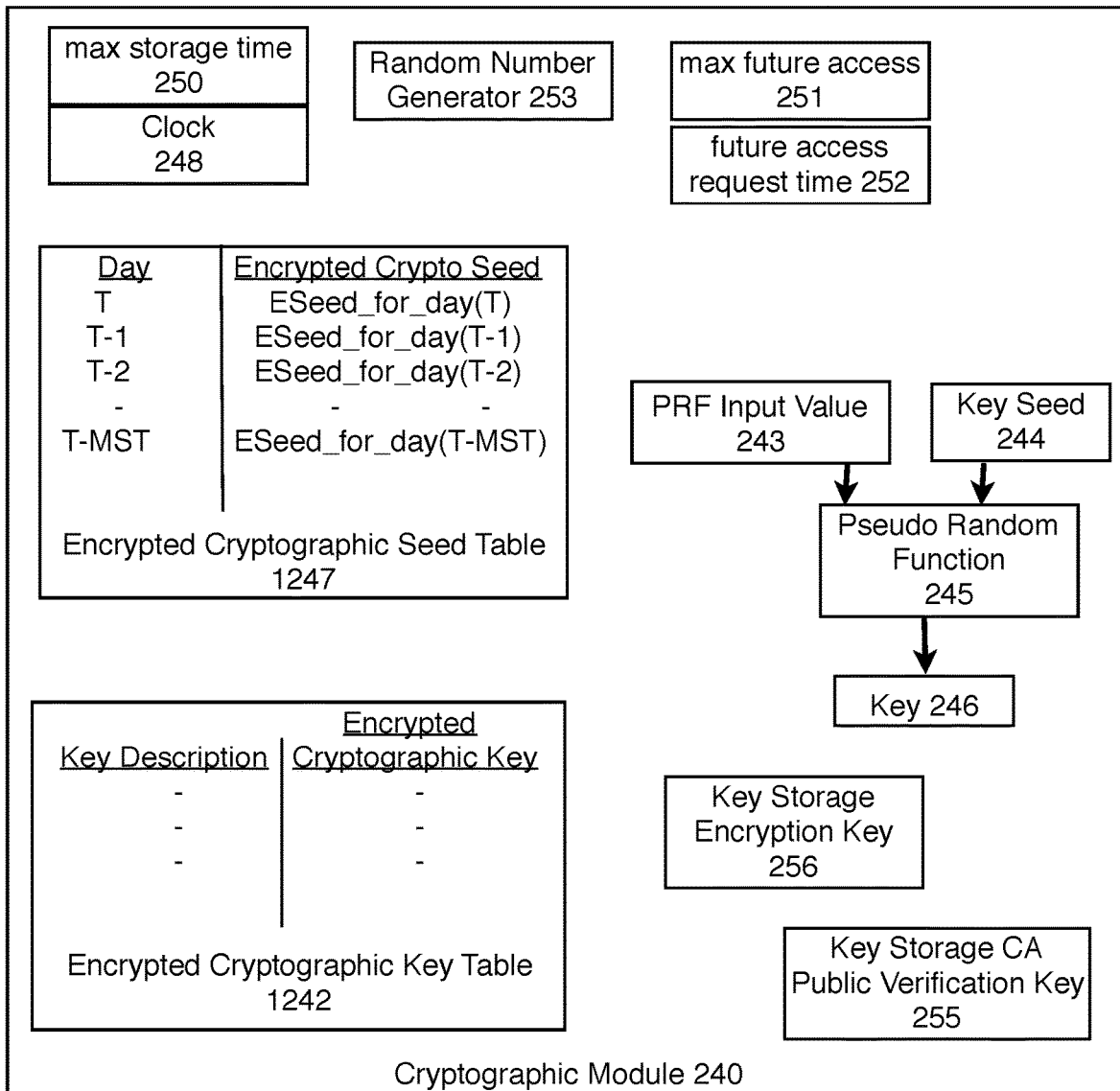
FIG. 12 is an illustration of a modification to the cryptographic module 240 introduced in FIG. 4 showing the addition of a key storage encryption key 256, encrypted cryptographic key table 1242, and encrypted cryptographic seed table 1247.

The EAE encryption public key 292 is provided to the manufacturer of computing device 200. During manufacturing, the manufacturer embeds the EAE encryption public key 292 in the cryptographic module 240 as key storage encryption key 256, as shown in FIG. 12.

In some embodiments, the manufacturer embeds a key storage CA (certificate authority) public verification key 255 into cryptographic module 240. In this embodiment, there is a certificate authority that has a corresponding key storage CA private signature key that signs a certificate for key storage encryption key 256. In this embodiment, cryptographic module 240 receives key storage encryption key 256 in a certificate signed by the key storage CA private signature key. Cryptographic module 240 verifies the certificate using the key storage CA public verification key 255, as shown in FIG. 12. In some embodiments, the key storage encryption key 256 and/or the key storage CA public verification key 255 may be placed in access control module 210.

Cryptographic key table 242 is described above in conjunction with FIG. 4. In some embodiments, instead of having a cryptographic key table 242, there is an encrypted cryptographic key table 1242, as shown in FIG. 12. In some embodiments, a key used by cryptographic module 240 is first encrypted using key storage encryption key 256 before it is placed in encrypted cryptographic key table 1242. In some embodiments, a known cryptographic protocol is used for this encryption, such as generating a symmetric key SYM_KEY, encrypting one or more cryptographic keys with SYM_KEY using a symmetric encryption algorithm such as AES, and encrypting SYM_KEY with the public key storage encryption key 256. In some embodiments, when the authorized access payload 220 includes a key description, the cryptographic module 240 responds with the corresponding encrypted cryptographic key(s) matching that key description. In some embodiments, the key description stored in the encrypted cryptographic key table 1242 includes a date and time, and the key description in the authorized access payload 220 also includes a range of dates and times. In some embodiments, the cryptographic module 240 deletes a key in the encrypted cryptographic key table 1242 when a key has been stored for longer than the maximum storage time 250.

The functionality and use of the cryptographic seed table 247 are described above in conjunction with FIG. 4. In some embodiments, instead of having a cryptographic seed table 247, there is an encrypted cryptographic seed table 1247, as shown in FIG. 12. In some embodiments, a seed generated by the cryptographic module 240 is first encrypted using the key storage encryption key 256 before the seed is placed in the encrypted cryptographic seed table 1247. The term ESeed is used in FIG. 12 in encrypted cryptographic seed table 1247 to denote the encrypted seed. In some embodiments, a known cryptographic protocol is used for this encryption, such as generating a symmetric key SYM_KEY, encrypting one or more cryptographic seeds with SYM_KEY using a symmetric encryption algorithm such as AES, and encrypting SYM_KEY with the public key storage encryption key 256. In some embodiments, when the authorized access payload 220 includes a request for cryptographic seeds, the cryptographic module 240 responds with the corresponding encrypted cryptographic seed(s).

External access policy 213 is described above in conjunction with FIG. 3. In some embodiments, the external access policy 213 includes an identification of the access verification public key 211. In some embodiments, the external access policy 213 includes an identification of the key storage encryption key 256 or the key storage CA public verification key 255.

The above description is included to illustrate the operation of preferred embodiments, and is not meant to limit the scope of the invention. The scope of the invention is to be limited only by the following claims. From the above description, many variations will be apparent to one skilled in the art that would yet be encompassed by the spirit and scope of the present invention.

What is claimed is:

1. A method for assuring that a computing device meets preselected requirements of external accessibility before allowing the computing device to access an external network, said method comprising the steps of a policy network access point:
   receiving from the computing device a proof of establishing satisfaction of external accessibility requirements set by the policy enforcing network access point, where the external accessibility requirements include requiring execution of a validated payload, and validation of the payload uses a value unique to said computing device;
   checking validity of the proof; and
   granting the computing device access to the external network when the validity of the proof has been confirmed by the checking;
   wherein satisfaction of the external accessibility requirements comprises satisfaction of one of the following two rules:
   there is no software-only method for modifying external accessibility capabilities of the computing device;
   there is a method to assure that when the computing device is coupled to the external network, the policy enforcing network access point is informed when external accessibility capabilities of the computing device are modified through software such that the computing device no longer satisfies the external accessibility requirements.

2. The method of claim 1, wherein the external accessibility requirements comprise:
   the computing device validating authorization of an external access payload, by verifying a digital signature affixed to the payload; and
   the computing device permitting the authorized external access payload to execute on the computing device.

3. A computing device operated by a user of the computing device, said computing device comprising:
   an access control module configured to authorize an external access entity to access a cryptographic module located within the computing device, wherein:
   said authorization comprises verifying a digital signature affixed by the external access entity;
   the external access entity is not a user;
   the cryptographic module is configured to use keys in cryptographic computations, including communication keys for encrypted communications with other devices, and to store communication keys for a period of time commencing with or prior to use of the communication keys by the computing device and ending at a time after the communication keys have been used; and
   the cryptographic module is further configured to provide access to stored communication keys to an external access entity authorized by the access control module;
   said computing device further comprising:
   an access archive module configured to record any authorized access of the cryptographic module by an external access entity, wherein a record stored in the access archive module cannot be modified or deleted by an authorized external access entity; and
   the access archive module is further configured to output recorded information pertaining to authorized access by an external access entity.

4. A method for providing authorized access to cryptographic keys stored in a computing device, said method comprising the steps of the computing device:
   using communication keys for encrypted communications with other devices, said using taking place in a cryptographic module located within the computing device;
   storing the communication keys in the cryptographic module;
   keeping said communication keys stored for a period of time after use of said communication keys by the computing device;
   receiving a request from an external access entity to access at least one of the stored communication keys, wherein said request comprises a digital signature not created on the computing device;
   validating the digital signature of the external access entity request using a public verification key embedded in the computing device;
   providing the external access entity with access to the requested stored communication keys when the digital signature has been validated; and
   recording information contained in the validated external access entity request in a record that cannot be deleted or modified by the external access entity.

5. A computing device operated by a user of the computing device, said computing device comprising:
   an access control module configured to authorize an external access entity to access a cryptographic module, wherein:
   said authorization comprises verifying that a cryptographic computation was correctly computed by the external access entity;
   the external access entity is not a user and is not a module executing on the computing device;
   the cryptographic module is configured to use communication keys for encrypted communications with other devices; and
   the cryptographic module is further configured to provide access to said communication keys to an external access entity authorized by the access control module;
   said computing device further comprising:
   an access archive module configured to record any authorized access of the cryptographic module by an external access entity, wherein a record stored in the access archive module cannot be modified or deleted by an authorized external access entity; and
   the access archive module is further configured to output recorded information pertaining to authorized access by an external access entity.

6. The computing device of claim 5, wherein:
   the cryptographic computation computed by the external access entity is a digital signature computation that is not computed on the computing device; and
   said authorization comprises verifying the digital signature.

7. The computing device of claim 5, wherein the external access entity is not a user of the computing device.

8. The computing device of claim 5, wherein a user is not able to use software to prevent an authorized external access entity from obtaining the communication keys.

9. The computing device of claim 5, further comprising a stored encryption key, wherein:
   the cryptographic module is configured to encrypt the communication keys using the stored encryption key;

the cryptographic module is further configured to store the encrypted communication keys for a period of time commencing with the use of the communication keys by the computing device and ending at a time after the communication keys have been used; and the cryptographic module is further configured to provide access to the stored encrypted communication keys to an external access entity authorized by the access control module.

10. A method for providing a computing device with authorized access to communication keys used for encrypted communications with other devices, said method comprising the steps of the computing device:

using the communication keys in a cryptographic module located within the computing device;

receiving a request from an external access entity to access at least one of the communication keys, wherein said request comprises the result of a cryptographic computation not computed on the computing device;

validating the cryptographic computation of the external access entity request using a public verification key embedded in the computing device;

providing the external access entity with access to the requested communication keys when the digital signature cryptographic computation has been validated; and recording information contained in the validated external access entity request in a record that cannot be deleted or modified by the external access entity.

11. The method of claim 10, wherein:

the cryptographic computation underlying said request is a digital signature computation; and the validation of the cryptographic computation is a digital signature verification.

12. The method of claim 10, further comprising the steps of:

encrypting the communication keys using an encryption key stored on the computing device;

storing the encrypted communication keys on the computing device; and providing the external access entity with access to the encrypted stored communication keys when the cryptographic computation has been validated.

13. A computing device operated by a user of the computing device, said computing device comprising:

an access control module configured to authorize an external access entity to access a cryptographic module, wherein:

said authorization comprises verifying that a cryptographic computation was correctly computed by the external access entity;

the external access entity is not a user and is not a module executing on the computing device;

the cryptographic module is configured to use cryptographic keys in cryptographic computations, and to store seeds that can be used to derive said cryptographic keys for a period of time after the generation of said seeds; and the cryptographic module is further configured to provide access to the stored seeds to an external access entity authorized by the access control module; said computing device further comprising:

an access archive module configured to record any authorized access of the cryptographic module by an external access entity, wherein a record stored in the access archive module cannot be modified or deleted by an authorized external access entity; and the access archive module is further configured to output recorded information pertaining to authorized access by an external access entity.

14. The computing device of claim 13, wherein the cryptographic keys are used for encrypted communications with other devices.

15. A method for providing authorized access to cryptographic keys stored in a computing device, said method comprising the steps of the computing device:

generating seeds in a cryptographic module located within the computing device;

deriving cryptographic keys from said seeds in said cryptographic module;

storing the seeds in the cryptographic module, and keeping said seeds stored for a period of time after use of said cryptographic keys by the computing device;

receiving a request from an external access entity to access at least one of the stored seeds, wherein said request comprises the result of a cryptographic computation not performed on the computing device;

validating the cryptographic computation of the external access entity request using a public verification key embedded in the computing device;

providing the external access entity with access to the requested stored seeds when the cryptographic computation has been validated; and recording information contained in the validated external access entity request in a record that cannot be deleted or modified by the external access entity.

16. The method of claim 15, wherein the cryptographic keys are used for encrypted communications with other devices.

* * * * *